United States Patent

Kahn et al.

[15] 3,669,947

[45] June 13, 1972

[54] PROCESS FOR THE PRODUCTION OF ALPHA-METHYLSTYRENE POLYMER

[72] Inventors: Henry Kahn, Arlington Heights; Takeo Hokama, Chicago, both of Ill.

[73] Assignee: Velsicol Chemical Corporation, Chicago, Ill.

[22] Filed: Feb. 2, 1970

[21] Appl. No.: 8,030

[52] U.S. Cl. .................................................. 260/93.5 S
[51] Int. Cl. ........................................ C08f 7/04, C08f 1/08
[58] Field of Search ..................................... 260/93.5 S

[56] References Cited

UNITED STATES PATENTS 2,507,338  5/1950  Heiligmann ........................... 260/93.5
2,941,989  6/1960  Ford et al. ............................. 260/93.5

OTHER PUBLICATIONS

Plesch et al.— Chemical Society Journal— 1947— Part I pp. 257–265

*Primary Examiner*—James A. Seidleck
*Attorney*—Robert J. Schwarz

[57] ABSTRACT

A process for the production of alpha-methylstyrene polymer which comprises continuously polymerizing alpha-methylstyrene dissolved in an inert organic reaction medium at a concentration of from about 5 to about 20 weight percent which has been precooled to a temperature between about 0 and about −50° C in the presence of water and a Friedel-Crafts halide at atmospheric pressure and substantially adiabatic conditions.

8 Claims, No Drawings

PROCESS FOR THE PRODUCTION OF ALPHA-METHYLSTYRENE POLYMER

The present invention relates to a process for preparing alpha-methylstyrene polymers having properties desirable for applications in the manufacture of vinyl asbestos floor tiles, electrostatic paper binders, adhesives and overprint lacquers. More particularly, the invention relates to a continuous process whereby polymers of alpha-methylstyrene having certain defined properties can be prepared in substantially quantitative yields at atmospheric pressure and adiabatic reaction conditions.

The alpha-methylstyrene polymers produced by the process of the present invention are clear, colorless resins having a certain range of properties as defined by their molecular weight, softening point, solution and molten viscosities, compatibility with other polymeric materials and their solubility in various organic solvents. It is this combination of properties which gives these polymers their utility for applications in the vinyl floor tile, electrostatic paper binder, adhesive and overprint lacquer industry.

The molecular weight of the products of the process of the present invention in distinction to typical alpha-methylstyrene polymers is very low and is within a limited range. Generally the molecular weights of these polymers can range from about 4,000 to about 30,000. Those resins which are intended for application in vinyl floor tiles have a narrower molecular weight in the lower part of this range usually averaging from about 4,000 to about 20,000, while the resins intended for overprint lacquer applications are those in the upper part of the range averaging from about 10,000 to about 30,000. As used herein the molecular weight is described in terms of the weight average molecular weight $\overline{M}w$. The significance of this molecular weight term and the method of its determination is described in Structure of Polymers, M. I. Miller, Reinhold, New York, 1966.

The softening points of the resins produced by the process of this invention can vary from 100° to about 400° F depending on the specific process conditions employed as hereinafter described. The lower softening point resins such as those having a softening point between about 190° and about 240° F are more suited in the floor tile industry, while the higher softening point products such as those ranging from 270° to about 360° F are preferred in the overprint lacquer applications. The softening point referred to herein is determined by the standard ring and ball method A.S.T.M. Method E 28.

Another characteristic of the resins produced by the process of this invention are good solubility in various solvents including aromatic solvents such as benzene, toluene, xylene, and the like. Furthermore, these resins have good compatibility with vinyl resins such as the polyvinyl chloride resins which are extensively used in the floor tile industry. In addition, the resins have relatively low molten viscosities. This property is particularly desirable during the manufacture of floor tiles where it aids in the milling whereby tiles are made.

The alpha-methylstyrene polymers having the above described characteristics can be readily prepared, in a manner heretofore unknown, by the process of this invention. It has now been found that the described alpha-methylstyrene resins can be prepared by a continuous process in exceedingly short reaction times. Polymers having a weight average molecular weight of up to 30,000 can hereby be prepared continuously utilizing polymerization times ranging between about 10 seconds and about 2 minutes. These short reaction times result in a process whereby large quantities of the desired products can be prepared while utilizing modest reaction equipment of limited size.

It has also been found that the described resins can be prepared at atmospheric pressure while still maintaining the short reaction times. The use of atmospheric reaction conditions further simplifies the reaction equipment which can be used for the present process and eliminates the dangers and difficulties which normally accompany high pressure operations.

More significantly, it has been found that alpha-methylstyrene can be prepared via a substantially adiabatic process. Such a process has many advantages over an isothermal process because of the low temperatures required for the polymerization of alpha-methylstyrene and the highly exothermic nature of the process. Thus, the present process does not require the removal of heat of polymerization from the reaction site but can be carried out upon merely precooling the feed stream to the required temperature. Surprisingly, this procedure does not result in the formation of large quantities of dimers and trimers as would be expected. The precooling temperatures to which the feed stream of this process must be subjected are no more severe than would be required in many isothermal processes, and in many instances can be higher, such as temperatures ranging up to about 0° C.

The continuous polymerization of alpha-methylstyrene by the present process is carried out in relatively dilute solutions of the monomer in an inert organic solvent. A wide variety of solvents can be used, their only requirements being inertness to the polymerization conditions and the ability to dissolve both the monomer and the produced polymer at the relatively low temperatures of the process. Solvents which meet these requirements and which are particularly suitable for the process of this invention are aromatic hydrocarbons.

The process of this invention also utilizes a polymerization catalyst which is dispersed or dissolved in the feed stream. Friedel-Crafts halides are the catalysts, which are generally suitable in effecting the process, but the catalysts which are most suitable and preferred are those selected from the group consisting of boron trifluoride, aluminum chloride, ethyl aluminum dichloride, diethylaluminum chloride and mixtures thereof. Small amounts of water which act as a cocatalyst must be present in the reaction mixture to make the above listed catalysts effective.

In its broadest scope the process of this invention comprises the polymerization at atmospheric pressures and adiabatic conditions of a dilute feed stream of alpha-methylstyrene containing a suitable catalyst and small amounts of water which has been precooled to a temperature sufficiently low so as to minimize the formation of dimers and trimers of the alpha-methylstyrene. To make this process operative the various steps and procedures must be performed within certain specific limits. Moreover, to prepare an alpha-methylstyrene resin having a given set of properties within the range hereinabove described, it is necessary to observe the interrelation of the parameters which define this process.

Of particular importance in the process of this invention are the limitations of the monomer concentration in the feed stream entering the polymerization reactor and the temperature of the feed stream. Generally, to obtain alpha-methylstyrene polymers as heretofore described, the monomer concentration in the feed stream must be maintained below about 30 percent by weight of the total feed stream and preferably is maintained at a concentration ranging between about 5 percent and about 20 percent by weight of the feed stream. The lower concentrations of alpha-methylstyrene monomer in the feed stream results in a product of higher molecular weight and softening point, as determined by the ring and ball method, and results in lesser dimer and trimer formation. The higher monomer concentrations in the feed stream will result in lower molecular weight and softening point products containing a greater proportion of undesirable dimers and trimers.

Since the process of the present invention is an adiabatic one, the temperature at which the feed stream enters the reactor is controlling as to the polymerization temperatures at which the product is actually prepared. It has been found that the feed stream must be precooled to at leas 0° C and generally to a temperature ranging between about −50° and about 0° C in order to obtain products having the necessary physical properties required for application in the vinyl floor tile, electrostatic paper binder, adhesive and overprint lacquer industries. The lower temperatures such as those ranging between about −50° and about −20° C result in resins having higher molecular weights and softening points, while the higher temperatures such as those ranging between about −20° to about 0° C result in products of lower molecular weight and softening point.

In actual practice the simultaneous effect of both the initial temperature of the feed stream and the monomer concentration in the feed stream must be considered. For example, the average molecular weight of the product can be kept the same over a certain range of one of the parameters by counteracting its effect with the other parameter. However, while the average molecular weight may stay about the same, the molecular weight distribution of the resulting polymer will vary and the physical properties will change accordingly. This aspect of the process of the present invention can be put to use in producing resins which can be tailored to a specific application. Furthermore, by varying both the temperature and monomer concentration in the same direction in terms of their effect on polymerization product, the additive effect can be utilized to prepare polymers having properties at the extremes of the ranges heretofore described.

The concentration of alpha-methylstyrene monomer in the feed stream can be maintained through various means. One method comprises simply co-mixing the alpha-methylstyrene and the inert organic solvent in the proportions required by the process of this invention. A preferred method of maintaining the required monomer concentration in the feed stream, however, comprises co-mixing the alpha-methylstyrene with the inert organic solvent such that a solution of the monomer ranging between about 30 and 60 percent by weight is obtained, and thereafter recycling a sufficient amount of the polymerization effluent, comprising polymer and inert solvent, into the feed stream such that the monomer concentration is lowered to between about 5 and about 20 percent by weight of the total mixture. This is a preferred method since it requires lesser amounts of solvent and facilitates the removal of polymer from the remaining effluent.

The above enumerated advantages and requirements are realized by a process for the production of alpha-methylstyrene polymer which comprises continuously polymerizing alpha-methylstyrene dissolved in an inert organic reaction medium at a concentration of from about 5 to about 20 weight percent which has been precooled to a temperature between about 0 and about −50° C in the presence of a catalytic amount of water and a Friedel-Crafts halide at atmospheric pressure and substantially adiabatic conditions.

As indicated, a preferred mode of carrying out the present process comprises utilizing part of the polymerization product solution as the inert reaction medium. Thus another embodiment of the present invention resides in a process which comprises a. cooling a feed stream of alpha-methylstyrene dissolved in an aromatic hydrocarbon solvent at a concentration of from about 30 to about 60 percent by weight and containing from about 2 to about 100 ppm of water based on alpha-methylstyrene to a temperature of from about 0° to about −50° C, b. mixing a sufficient amount of the polymerization product solution which has been cooled to a temperature of from 0° to about −50° C with the feed stream such that the alpha-methylstyrene concentration in the total mixture ranges from about 5 to about 20 percent by weight while simultaneously adding a catalyst selected from the group consisting of boron trifluoride, aluminum chloride, ethyl aluminum dichloride, diethyl aluminum chloride and mixtures thereof in an amount of from about 0.05 to about 2.0 percent by weight based on alpha-methylstyrene to the recycled polymerization product solution and c. polymerizing the alpha-methylstyrene in the mixture at atmospheric pressure and substantially adiabatic conditions.

The process of the present invention can be carried out in a pipeline reactor of sufficient length such that it provides for a residence time for the reactants which ranges from about 15 seconds to about 2 minutes. The diameter of the pipe can vary with the rate of flow of the feed stream. Larger diameters require higher flow rates to prevent back-mixing and provide uniform polymerization conditions, while lower flow rates can be used with smaller diameter pipe.

When the preferred process of this invention, wherein part of the polymerization effluent is recycled for the purpose of controlling the monomer concentration in the feed stream, is employed, the entry to the pipeline reactor is equipped with a mixing jet. This jet provides for a rapid and thorough blending of the monomer solution of alpha-methylstyrene in the inert organic solvent and the recycled reactor effluent.

The reactor effluent consisting substantially of polymer solution in organic solvent is directed into a suitable level control vessel whereby, in conjunction with an orifice flow control instrument, the proportion of effluent which is recycled can be controlled as required to control the monomer concentration. As previously indicated the recycled reactor effluent as well as the alpha-methylstyrene monomer solution must be precooled before entering the mixing jet. This can be accomplished with standard heat exchange equipment of sufficient capacity to enable the cooling of these streams to temperatures of about −50° C. Freon evaporators are well suited for this purpose.

The catalyst which is required to carry out the process of this invention can be conveniently introduced into the polymerization mixture by injecting it into the recycling effluent. Preferably this is done after the effluent has been cooled to the required temperature. By this procedure polymerization initiates upon mixing of the two streams in the mixing jet and continues in the pipeline reactor. Premature polymerization in the feed stream is thereby eliminated and an efficient catalyst utilization is insured.

As hereinabove indicated the polymerization mixture must contain small amounts of water to make the catalyst effective. Thus water acts as a cocatalyst in the process of this invention and anhydrous conditions must be avoided. Generally, a quantity in excess of 2 parts per million of water based on alpha-methylstyrene monomer can be used in the present process, but an amount of from about 2 to about 100 ppm is preferred. Excess quantities of water, while not directly harmful, will result in greater catalyst consumption and thereby adversely effect the economics of the process. These indicated quantities of water required to carry out the process of this invention are usually present as an impurity in the alpha-methylstyrene monomers available in commercial quantities and it is therefore not necessary to separately incorporate water into the feed stream in most instances.

The primary catalyst for this process selected from the group consisting of boron triflouride, aluminum chloride, ethyl aluminum dichloride, diethyl aluminum chloride and mixtures thereof can be incorporated into the feed stream or preferably the recycling reactor effluent stream as such or as a solution in an inert solvent such as heptane or in the case of aluminum chloride, which is insoluble in such solvents, in the form of a slurry in mineral oil and the like. Generally, an amount of from about 0.05 to about 2.0 percent by weight based on alpha-methylstyrene of catalyst can be used. Thus the ratio of water to primary catalyst which can be generally used in the present process ranges from about 1:1000 to about 1:2 by weight, while the preferred ratio ranges from about 1:400 to about 1:50 by weight.

The above preferred manner of carrying out the process of this invention is realized in a process which comprises a. cooling a feed stream consisting of a solution of alpha-methylstyrene in a concentration of from about 30 to about 60 weight percent in an aromatic hydrocarbon solvent and from about 2 to about 100 ppm of water based on the alpha-methylstyrene to a temperature between about 0° C and −50° C, b. continuously flowing said feed stream through a mixing jet into a pipeline reactor and polymerizing the alpha-methylstyrene at atmospheric pressure and substantially adiabatic conditions, c. recycling a sufficient amount of the effluent from the pipeline reactor after cooling it to a temperature ranging from about 0° C to about − °C to the mixing chamber such that the alpha-methylstyrene concentration in the mixture entering the pipeline reactor ranges between about 5 and about 20 percent by weight of the total mixture while simultaneously adding a catalyst selected from the group consisting of boron trifluoride, aluminum chloride, ethyl aluminum dichloride, diethyl aluminum chloride and mixtures thereof to the recycling effluent in an amount of from about 0.05 to about 2.0 percent by weight based on the alpha-methylstyrene in the feed stream.

To start the continuous process of this invention, wherein a portion of the reactor effluent is used as a diluent for the monomer feed stream, the pipeline reactor and recycling line including the level control vessel and heat exchanger can be filled with inert organic solvent. The solvent is then recycled to cool it to the operating temperature, precooled monomer solution is pumped into the mixing jet and catalyst is injected into the recycling stream. Thereafter, the rates of monomer feed and recycling effluent are adjusted to within the desired limits to produce an alpha-methylstyrene polymer having a specific range of properties.

The portion of reactor effluent which is not recycled for the purpose of adjusting the monomer concentration is sent to the catalyst removal equipment and the stripping tower to recover the desired product. The catalyst can be removed from the polymerization products by washing the polymer solution with aqueous alkali such as a slurry of water and lime or alkaline earth metal hydroxide or carbonates. The catalyst can also be removed by passing the polymerization product through a bed of activated clays such as fuller's earth, particularly when boron trifluoride is used as the catalyst.

The process of the present invention is more specifically illustrated in the following examples.

EXAMPLE 1

Alpha-methylstyrene was mixed with toluene to provide a solution having an alpha-methylstyrene concentration of about 10 percent. This monomer solution was then cooled to a temperature of about −25° C by indirect heat exchange and was passed through a pipeline reactor having a 2 inch diameter and a length of 60 feet at a rate of about 15 gallons per minute. Boron trifluoride catalyst was simultaneously added to the pipeline reactor in a concentration of 0.4 percent based on alpha-methylstyrene in the solution. The effluent of the reactor was then neutralized using an aqueous slurry of lime, was filtered and was stripped of toluene to yield an alpha-methylstyrene polymer having a ring and ball softening point of 210°F and a Gardner color of 1.

EXAMPLE 2

Alpha-methylstyrene was mixed with toluene to provide a solution having an alpha-methylstyrene concentration of about 6 percent. This monomer solution was then cooled to a temperature of about −37° C by indirect heat exchange and was passed through a 60 foot long pipeline reactor having a 2 inch diameter at a rate of about 15 gallons per minute. Boron trifluoride catalyst was simultaneously added to the pipeline reactor in a concentration of 0.4 percent based on alpha-methylstyrene in the solution. The effluent of the reactor was then neutralized using an aqueous slurry of lime, was filtered and stripped of toluene to yield an alpha-methylstyrene polymer having a ring and ball softening point of 330° F and a Gardner color of about 1.

EXAMPLE 3

Alpha-methylstyrene was mixed with toluene to provide a solution having an alpha-methylstyrene concentration of about 20 percent. This monomer solution was cooled to a temperature of about −37° C by indirect heat exchange and was passed through a 60 foot long pipeline reactor having a 2 inch diameter at a rate of about 15 gallons per minute. Boron trifluoride catalyst was simultaneously added to the pipeline reactor in a concentration of 0.4 percent based on alpha-methylstyrene in the solution. The effluent from the reactor was then neutralized using an aqueous slurry of lime, was filtered and stripped of toluene to yield an alpha-methylstyrene polymer having a ring and ball softening point of 225° F.

EXAMPLE 4

A pipeline reactor equipped with a mixing jet at its entry port and a recycling line from the exit port of the reactor to the mixing jet whereby any portion of the reactor effluent can be cooled and recycled back into the mixing jet are filled with toluene. The toluene is recycled and is cooled to a temperature of about −50° C. Alpha-methylstyrene containing about 2 ppm of water is mixed with toluene to provide a solution containing about 50 percent by weight of the alpha-methylstyrene. The monomer solution is cooled to a temperature of about −50° C and is pumped into the mixing jet. Boron trifluoride is simultaneously added to the recycling reactor effluent at a rate of about 0.05 percent by weight based on alpha-methylstyrene concentration in the feed stream entering the pipeline reactor is about 5 percent. That portion of the reactor effluent which is not recycled is neutralized with an aqueous slurry of lime and is stripped of toluene to yield the desired alpha-methylstyrene polymer.

EXAMPLE 5

A pipeline reactor equipped with a mixing jet at its entry port and a recycling line from the exit port of the reactor to the mixing jet whereby any portion of the reactor effluent can be cooled and recycled back into the mixing jet are filled with xylene. The xylene is recycled and cooled to a temperature of about 0° C. Alpha-methylstyrene containing about 100 ppm of water is mixed with sufficient xylene to provide a solution containing about 40 percent by weight of the alpha-methylstyrene. The monomer solution is cooled to a temperature of about 0° C and is pumped into the mixing jet. A solution of ethyl aluminum dichloride in xylene is simultaneously added to the recycling effluent at a rate of about 2 percent by weight based on alpha-methylstyrene in the feed stream and the recycling rate of the effluent is adjusted such that the alpha-methylstyrene concentration in the feed stream entering the pipeline reactor is about 5 percent. The rate of the entire feed stream is then adjusted such that the reaction mixture has a residence time of about 15 seconds in the pipeline reactor. The reactor effluent which is not recycled is then filtered and stripped of xylene under reduced pressure to yield the desired alpha-methylstyrene polymer.

EXAMPLE 6

A pipeline reactor equipped with a mixing jet at its entry port and a recycling line from the exit port of the reactor to the mixing jet whereby any portion of the reactor effluent can be cooled and recycled back into the mixing jet are filled with cumene. The cumene is recycled and is cooled to a temperature of about −30° C. Alpha-methylstyrene containing about 50 ppm of water is mixed with a sufficient amount of cumene to provide a solution containing about 45 percent by weight of the alpha-methylstyrene. The monomer solution is cooled to a temperature of about −30° C and is pumped into the mixing jet. A solution of diethyl aluminum chloride in cumene is simultaneously added to the recycling effluent at a rate of about 0.1 percent by weight based on alpha-methylstyrene in the feed stream and the recycling rate of the effluent is adjusted such that the alpha-methylstyrene concentration in the feed stream entering the pipeline reactor is about 15 percent. The rate of the entire feed stream is then adjusted such that the reaction mixture has a residence time of about 1 minute in the pipeline reactor. The reactor effluent which is not recycled is then passed through a bed of fuller's earth and is stripped of cumene under reduced pressure to yield the desired alphanmethylstyrene polymer.

EXAMPLE 7

A pipeline reactor equipped with a mixing jet at its entry port and a recycling line from the exit port of the reactor to the mixing jet whereby any portion of the reactor effluent can be cooled and recycled back into the mixing jet are filled with xylene. The xylene is recycled and is cooled to a temperature of about −20° C. Alpha-methylstyrene containing about 200 ppm of water is mixed with a sufficient amount of xylene to provide a solution containing about 30 percent by weight of the alpha-methylstyrene. The monomer solution is cooled to a temperature of about −20° C and is pumped into the mixing jet. A solution of ethyl aluminum sesquichloride (an equal mixture of ethyl aluminum dichloride and diethyl aluminum chloride) in xylene is simultaneously added to the recycling effluent at a rate of about 0.5 percent by weight based on alpha-methylstyrene in the feed stream. The recycling rate of the effluent is adjusted such that the alpha-methylstyrene concentration in the feed stream entering the pipeline reactor is about 8 percent. The rate of the entire feed stream is then adjusted such that the reaction mixture has a residence time of about 1 minute in the pipeline reactor. The reactor effluent which is not recycled is then mixed with 30 weight percent methanol based on the catalyst, extracted with water and is stripped of xylene under reduced pressure to yield the desired alpha-methylstyrene polymer.

We claim:

1. A process for the production of alpha-methylstyrene polymer which comprises continuously polymerizing alpha-methylstyrene dissolved in an inert organic reaction medium at a concentration of from about 5 to about 20 weigh percent which has been precooled to a temperature between about 0 and about −50° C in the presence of a catalytic amount of water and a Friedel-Crafts halide at atmospheric pressure and adiabatic conditions.

2. The process of claim 1 wherein the inert organic reaction medium is an aromatic hydrocarbon solvent.

3. The process of claim 1 wherein at least 45 percent by weight of the inert organic reaction medium consists of recycled polymerized alpha-methylstyrene solution.

4. The process of claim 1 wherein the Friedel-Crafts halide is selected from the group consisting of boron trifluoride, aluminum chloride, ethyl aluminum dichloride, diethyl aluminum chloride and mixtures thereof.

5. The process for the production of α-methylstyrene polymer which comprises continuously polymerizing alpha-methylstyrene dissolved in an aromatic hydrocarbon solvent at a concentration of from about 5 to about 20 weight percent which has been precooled to a temperature between about 0° and about −50° C in the presence of from about 0.05 to about 1.0 percent by weight based on alpha-methylstyrene of a Friedel-Crafts halide selected from the group consisting of boron trifluoride, aluminum chloride, ethyl aluminum dichloride, diethyl aluminum chloride and mixtures thereof, and from about 2 to about 100 ppm of water based on alpha-methylstyrene at atmospheric pressure and adiabatic conditions.

6. The process for the production of α-methylstyrene polymer which comprises
   a. cooling a feed stream consisting of a solution of alpha-methylstyrene in a concentration of from about 30 to about 60 weight percent in an aromatic hydrocarbon solvent and from about 2 to about 100 ppm of water based on the alpha-methylstyrene to a temperature between about 0° and −50° C,
   b. continuously flowing said feed stream through a mixing jet into a pipeline reactor and polymerizing the alpha-methylstyrene at atmospheric pressure and adiabatic conditions and
   c. recycling a sufficient amount of the effluent from the pipeline reactor after cooling it to a temperature ranging from about 0° to about −50° C to the mixing chamber such that the alpha-methylstyrene concentration in the mixture entering the pipeline reactor ranges between about 5 and about 20 percent by weight of the total mixture while simultaneously adding a catalyst selected from the group consisting of a boron trifluoride, aluminum chloride, ethyl aluminum dichloride, diethyl aluminum chloride and mixtures thereof to the recycling effluent in an amount of from about 0.05 to about 2.0 percent by weight based on the alpha-methylstyrene in the feed stream.

7. The process of claim 6 wherein the aromatic hydrocarbon solvent is selected from the group consisting of toluene, xylene and cumene.

8. The process of claim 6 wherein the catalyst is boron trifluoride.

* * * * *

PO-1050
(5/69)

UNITED STATES PATENT OFFICE
CERTIFICATE OF CORRECTION

Patent No. 3,669,947      Dated June 13, 1972

Inventor(s) Henry Kahn and Takeo Hokama

It is certified that error appears in the above-identified patent and that said Letters Patent are hereby corrected as shown below:

In column 5, line 3 for " - $^{\circ}$C" should read -- -50$^{\circ}$C -- .

Signed and sealed this 17th day of October 1972.

(SEAL)
Attest:

EDWARD M. FLETCHER, JR.
Attesting Officer

ROBERT GOTTSCHALK
Commissioner of Patents